UNITED STATES PATENT OFFICE.

GEORG KRÄNZLEIN, OF SINDLINGEN, NEAR HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

ARYLAMINO-ANTHRAQUINONE DYESTUFFS.

1,139,540.     Specification of Letters Patent.     Patented May 18, 1915.

No Drawing.     Application filed July 1, 1914. Serial No. 848,474.

*To all whom it may concern:*

Be it known that I, GEORG KRÄNZLEIN, Ph. D., chemist, a citizen of the Empire of Germany, residing at Sindlingen, near Höchst-on-the-Main, Germany, have invented certain new and useful Improvements in Arylamino-Anthraquinone Dyestuffs, of which the following is a specification.

According to my present invention, by treating 1-amino-2-alkoxyanthraquinones, containing an acid substituent in paraposition to the amino group, with aromatic amins or a sulfonic acid thereof, new arylamino-anthraquinones are obtained which, when they contain already a sulfonic group or after sulfonation are violet dyestuffs dyeing even tints of excellent properties in respect of fastness. They dissolve in water to a violet solution and constitute sulfonic acids of the bodies of the general formula:

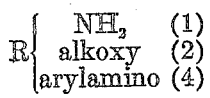

wherein R stands for an anthraquinone residue. Considering that the unsubstituted 1-amino-4-arylamino-anthraquinone as well as those brominated, methylated or phenoxylated in 2-position are, in the form of their sulfonic acids, blue wool dyestuffs (see U. S. Patents 675,572, 675,573, 654,295 and 715,662) it could not be foreseen that by introducing the alkoxy-group into 2-position, dyestuffs yielding a valuable violet tint would be obtained.

The new products are much superior to the violet acid anthraquinone dyestuffs at present on the market, particularly as regards their fastness to the action of alkalis and they have the further advantage that the violet tint obtainable thereby is not altered by chroming.

The following example serves to illustrate my invention; the parts being by weight: 1 part of 1-amino-2-ethoxy-4-bromanthraquinone is boiled for about 2 hours with 0.3 part of sodium acetate and 8 parts of para-toluidin, and after cooling to about 100° C., the excess of para-toluidin is expelled by steam. The violet product, left after steaming, can be directly used for the sulfonation by introducing it into 5–10 times its weight of fuming sulfuric acid. As soon as a test shows that the product is soluble in water, the mass is poured on ice and the whole filtered; the matter on the filter, after it has been dissolved, if necessary, in hot water, and salted out for purifying it, is washed with a dilute solution of common salt until it gives a neutral reaction and finally dried.

The sulfonic acid thus obtained has the formula:

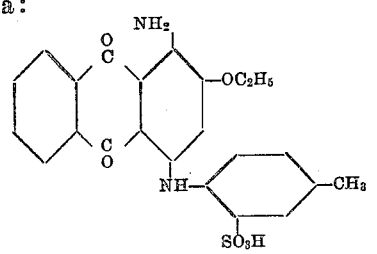

and constitutes a violet powder, dissolving in water to a violet solution and dyeing wool in an acid bath violet tints of excellent fastness to steaming and to the action of alkalis and which are only slightly altered by chroming them. Similar dyestuffs are obtained by substituting the methoxy group for the ethoxy group or by using for the reaction for instance anilin in place of the p-toluidin. There are also obtained analogous products by substituting for the base its sulfonic acids, for instance para-toluidin-meta-sulfonic acid. Moreover, by using instead of 1-amino-2-ethoxy-4-bromanthraquinone the corresponding chloro-substitution-derivative, like results are obtained.

Having now described my invention, what I claim is:

1. As new products, the herein described dyestuffs, being sulfonic acids of bodies of the general formula:

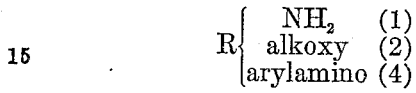

wherein R stands for an anthraquinone residue, which dyestuffs dissolve in water to a violet solution and dye wool in an acid bath, violet tints fast to alkalis and being only slightly altered by chroming.

2. As a new product, the herein described dyestuff of the formula:

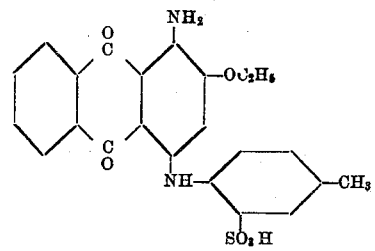

being a violet powder which dissolves in water to a violet solution and dyes wool in an acid bath violet tints fast to alkalis and being only slightly altered by chroming.

In testimony whereof I affix my signature in presence of two witnesses.

GEORG KRÄNZLEIN.

Witnesses:
JEAN GRUND,
CARL GRUND.